United States Patent [19]

Pechanek et al.

[11] Patent Number: 4,943,984
[45] Date of Patent: Jul. 24, 1990

[54] DATA PROCESSING SYSTEM PARALLEL DATA BUS HAVING A SINGLE OSCILLATOR CLOCKING APPARATUS

[75] Inventors: Gerald G. Pechanek; David J. Shippy, both of Endwell; Mark C. Snedaker, Vestal; Sandra S. Woodward, Endwell, all of N.Y.

[73] Assignee: International Business Machines Corporation, Armonk, N.Y.

[21] Appl. No.: 211,032

[22] Filed: Jun. 24, 1988

[51] Int. Cl.⁵ .................. H04L 7/00; G06F 1/04; H04Q 9/04
[52] U.S. Cl. .................. 375/109; 364/222; 364/260.1; 364/271.1; 364/919; 364/950.3
[58] Field of Search ........ 364/200, 900, 200 MS File, 364/900 MS File; 375/33, 10, 109, 107; 370/60; 371/22, 61; 340/825.2

[56] References Cited

U.S. PATENT DOCUMENTS

| | | | |
|---|---|---|---|
| 3,937,882 | 2/1976 | Bingham | 375/109 |
| 4,095,267 | 6/1978 | Morimoto | 364/200 |
| 4,208,724 | 6/1980 | Rattlingourd | 364/900 |
| 4,470,113 | 9/1984 | Oura | 364/200 |
| 4,691,294 | 9/1987 | Humpleman | 364/900 |
| 4,694,291 | 9/1987 | Denhez et al. | 340/825.2 |
| 4,701,845 | 10/1987 | Andreasen et al. | 364/200 |
| 4,713,830 | 12/1987 | McDonald | 375/109 |
| 4,720,784 | 1/1988 | Radhakrishnan et al. | 364/200 |
| 4,727,370 | 2/1988 | Shih | 375/109 |
| 4,783,778 | 11/1988 | Finch et al. | 370/60 |

*Primary Examiner*—Gareth D. Shaw
*Assistant Examiner*—Gopal C. Ray
*Attorney, Agent, or Firm*—Hugh D. Jaeger

[57] ABSTRACT

A synchronous parallel data bus particularly adapted for use in a data processing system where it is necessary to transfer data over long distances. The physical connection between communicating units includes a plurality of wires adapted to carry the parallel data signal and a wire which carries a clock signal to the remote unit. When data is transmitted from the remote unit to the base unit, the clock signal which originated at the base unit and was transmitted to the remote unit is "turned around" and transmitted back to the base unit for use in receiving the data from the remote unit.

22 Claims, 4 Drawing Sheets

DATA TRANSFER FROM CPU TO REMOTE UNIT

DATA TRANSFER FROM REMOTE UNIT TO CPU

DATA PROCESSING SYSTEM PARALLEL DATA BUS HAVING A SINGLE OSCILLATOR CLOCKING APPARATUS

TECHNICAL FIELD

This invention is directed to a data bus of the type used in data processing systems for high-speed, parallel transmission of data between the central processing unit and the peripheral and various other units making up the system. The invention relates to the clocking system used to synchronize the transmission and reception of data, and is designed to avoid the problems which arise when the length of the data bus causes the data to arrive at the receiving unit out of synchronism with the clock pulse used in decoding the data.

The improvement in semiconductor devices has led to the operation of data processing systems at higher and higher speeds which requires correspondingly higher speed for the transmission of data between units of the system. As transmission speed increases, the relationship between the data and the clock becomes more critical. In parallel transmission systems, the signal on the data lines is sampled at a precise time, determined by a clock signal. If the clock signal is earlier than the signal on the data lines, or later than the signal on the data lines, an erroneous value will result.

It is therefore imperative that the relationship between the clock signal and the signal on the data lines be accurately maintained such that the data lines are sampled at precisely the correct time.

Since the physical length of the paths from the system clock oscillator to the various components of the system will be different, the time of arrival of the clock pulse will also be different. This difference in arrival time, variously termed skew or phase difference, has been corrected by making all clock lines the same electrical length. This is done by careful attention to the routing of the clock lines within the system and by running the clock signal through delay lines to artificially lengthen the shorter paths. Another approach involves simply making the shorter lines longer by following a circuitous path. This results in a system in which the clock pulse arrives at all cards with minimum skew or phase difference.

Unfortunately, while making all clock lines the same length solves the timing problem for the clock pulses, the data lines are necessarily of the shortest possible length to gain speed, resulting in skew or phase difference at the logic card level. The maximum phase difference which can be tolerated by the system places a limitation on the maximum difference in physical length between two different paths. A typical system using a 40 ns clock rate is designed to operate over a 3 meter path without exceeding the maximum phase difference.

This limitation is acceptable for some systems, but there is a need for a clock system which can operate over greater path lengths and one which does not require the elaborate treatment of clock pulse transmission lines to ensure simultaneous arrival at all destinations.

BACKGROUND ART

Much of the error between a clock signal and a transmitted parallel data signal arises because of the difference in transmission distance for the two. It has been common practice to minimize this source of error by equalizing the distance traveled by the data and clock signals. Alternatively, an artificial delay can be introduced in one signal by running it through a delay line of suitable length.

These solutions have the disadvantage of being unique for each transmission path and require consideration of variations in the transmission path caused by connectors and other impedance discontinuities. Each transmission path must be individually tailored, and changes in the path require that the compensation be correspondingly modified.

Such solutions work reasonably well in a fixed environment where transmission distances are relatively short, but become burdensome where variable long distances are involved.

Additionally, when the difference in transmission line distance is compensated with artificial means such as a variable delay line, changes in transmission time caused by humidity or other such variables may lead to an out-of-tolerance operation.

The compensation problem is compounded by the fact that many communications links are bi-directional; that is, data may pass in both directions over the data bus. Since most compensation devices are unidirectional, two such devices are required for each bus. This characteristic compounds the difficulty of troubleshooting a bad bus since it will be necessary to determine whether the failure is occurring in the outbound link or the inbound link.

U.S. Pat. No. 3,919,695 discloses a data processing system having a plurality of units each with its own, adjustable clock. The system described is particularly adapted to use in a system having a number of semiconductor chips, each containing the circuitry for developing the clock signal and the appropriate delay. The penalty of 5% additional circuitry dedicated to the clock function is conceded. The approach is acceptable where the delays associated with each functional unit are fixed by the circuit board design, but becomes unwieldy when variable distances between units must be accommodated.

U.S. Pat. No. 4,285,063 discloses a data processing system in which each of the functional units which require clock pulses has an adjustable delay device which accommodates the variable delay associated with the physical location of the unit. Each functional unit has associated with it a variable length delay line which can be manually adjusted to provide the correct delay. Not only does this approach require a tedious manual adjustment of the delay line after the system is assembled, but any change to the system could require the adjustment process to be repeated because of changes in circuit loading as disclosed in the patent.

U.S. Pat. No. 4,426,713 discloses a data processing system which accommodates the difference in signal path delay times by introducing an adjustable artificial delay at the transmitting end of the system. A pilot signal is used to determine the optimum delay for each transmission path. This approach requires additional circuitry and lends itself to transmission in one direction only.

U.S. Pat. No. 4,490,821 is directed to a system for elimination of timing errors due to the differing distances between units of a data processing system. Time domain reflectometry is utilized to make physical measurements of the actual delays associated with the path from the clock buffer and each of the logic cards in a cabinet. Utilizing this measurement, a variable delay device is adjusted to provide the required compensation. This approach requires a separate delay device for each logic card which uses the clock, necessitates the tedious adjustment of the system after manufacture, and cannot be used on bi-directional lines without modification.

U.S. Pat. No. 4,637,018 describes a data processing system in which the skew associated with clock pulses distributed to various units is compensated for by the use of a variable delay device having an adjustable delay for each clock output signal. Again, this approach is feasible where the propagation path remains constant, for example, on a printed circuit board. This becomes quite cumbersome where unpredictable, variable length, delays occur in a system where the physical distance between units is greater than just the separation of circuits on the same card.

It is, of course, recognized that long bus implementations in the prior art can develop independent clock signals at both ends of the bus. This approach requires elaborate buffering and/or resynchronizing circuitry at both ends of the bus and necessarily delays transmission of data. The bus of this invention does not require that the data be delayed and does not require elaborate circuitry at either end of the bus.

DISCLOSURE OF THE INVENTION

It is a primary object of the invention to provide an improved clocking system for a bi-directional parallel data bus.

It is another object of the invention to provide a parallel data bus clocking system which is insensitive to the length of the bus.

It is still another object of the invention to provide a parallel data bus clocking system which accommodates various transmission paths without the need for adjustment.

Still another object of the invention is to provide a parallel data bus clocking system which accommodates the transmission of data over the bus in two directions.

These and other objects, features and advantages are realized by a data bus having a clocking system which transmits the clock signal on the bus in parallel with the data signal. The clock signal is utilized at the remote end of the bus for sampling the data signal. When data is transmitted back to the originating end of the bus, the clock signal received at the remote end is "turned around" and transmitted in parallel with the data being transmitted to the originating end of the bus. The clock signal existing at the then receiving end of the bus is always used for the sampling of the data signal.

Since the clock signal at the transmitting end of the bus is used to clock the data onto the data bus and is processed by the same circuits which amplify and shape the data signals, the clock signal subjected to the same transmission delays and phase shifts as the data signal and will therefore remain in synchronism with the high speed data signals over long distances without the need for adjustment or the introduction of variable length delay devices.

DESCRIPTION OF THE INVENTION

Figure 1:
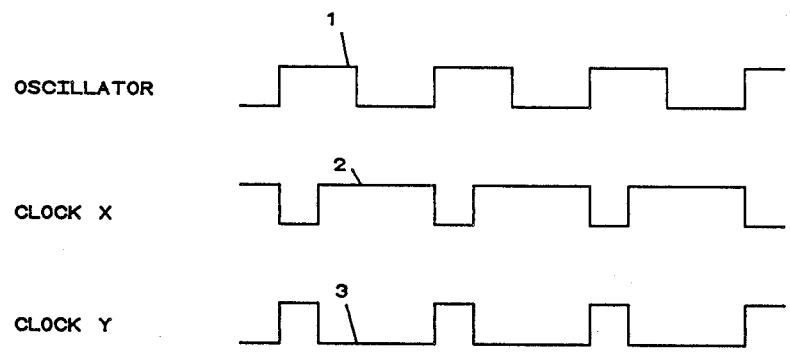
FIG. 1 is a timing diagram showing the relationship of the clock oscillator to the clock X and clock Y signals.

While the invention claimed herein is adaptable to various clocking systems and is not limited to a particular arrangement, the description is facilitated by reference to a specific arrangement. With reference to FIG. 1, the oscillator pulses of signal 1 are received in precise alignment at each logic card in the system. Each card uses identical circuitry on the logic card to develop the clock signals used on that card. For the purpose of description, it will be assumed that the oscillator cycle time is 40 ns and the pulses are symmetrical as shown, 20 ns up and 20 ns down.

Circuitry, not shown, is effective to delay the rising edge of the oscillator signal 1 for a period of 10 ns and add the 20 ns down portion of the signal to create a pulse that is up for 30 ns and down for 10 ns, designated as clock X and shown as signal 2. The signal 3, designated as clock Y, is developed by an inverter circuit which is not shown.

The data registers in the system incorporate a two latch system. The first latch (L1) follows the state of the bus conductor connected to the latch as long as the CLOCK X, signal 2, is up. L1 is "frozen" in the state which existed at the last time CLOCK X was up, when CLOCK X is down and CLOCK Y, signal 3, is up. The data thus stored in latch L1 is transferred to a second latch (L2) in each register position while CLOCK Y is up. It will be appreciated that the circuits are designed with conventional safeguards to prevent overlap of the CLOCK X and CLOCK Y pulses.

Data to be transmitted on the data bus is sent from the L2 latches. Data taken from the data bus is received by the L1 latches and gated from the data bus to the latch by the CLOCK X signal at the latch. From this it is apparent that the data placed on the bus will have at least 30 ns to travel over the data bus from the transmitting L2 latch to the receiving L1 latch.

Data transmitted on the bus is accompanied by the OSCILLATOR signal and circuitry at the receiving logic card uses signal 1 to locally develop the CLOCK X and CLOCK Y signals to ensure that the CLOCK X and CLOCK Y signals are in phase synchronism without skew relative to the data on the bus. The OSCILLATOR signal is developed by the transmitting card and placed on the data bus at the same time as the data.

It will be appreciated that the delay introduced by the transmission line which makes up the bus will be the same for the OSCILLATOR signal and the data signal. This means that the two signals will arrive at the receiving end of the bus after a period determined by the transmission characteristics of the line, but because they both traverse the same path, they will remain in synchronism with each other. Thus, unlike systems which use separate clock oscillators at opposite ends of the line, there is no deterioration in the phase relationship caused by the tolerances between oscillators. The OSCILLATOR signal 1 is used at the far (receiving) end of the line to generate the CLOCK X and CLOCK Y signals in the same fashion as was used at the near (transmitting) end.

When data is sent from the near end of the bus to the far end, it is sent (clocked) to the edge of the CLOCK X signal. Because the data travels in the same cable as the OSCILLATOR signal which created the CLOCK X signal, it arrives at the far end with the same relationship to the CLOCK X edge as it had when it was sent. Thus, the length and transmission characteristic of the cable is of no consequence. The data is clocked into registers at the far end and processed just as it would have been if had been received over zero distance.

When data is sent from the far end to the near end, the OSCILLATOR signal received at the far end is "fed through" i.e., "wrapped around" and sent back to the near end with the data originating at the far end.

Of course, the data which is received at the near end is accompanied by an OSCILLATOR signal which is out of phase with the original OSCILLATOR signal generated at the near end. For this reason, the OSCILLATOR signal which accompanied the data received from the far end is used to clock the data into the receiving register at the near end. Data is clocked out of the receiving register at the near end by the OSCILLATOR signal generated at the near end in synchronism with the processing of other data at the near end.

Figure 2:
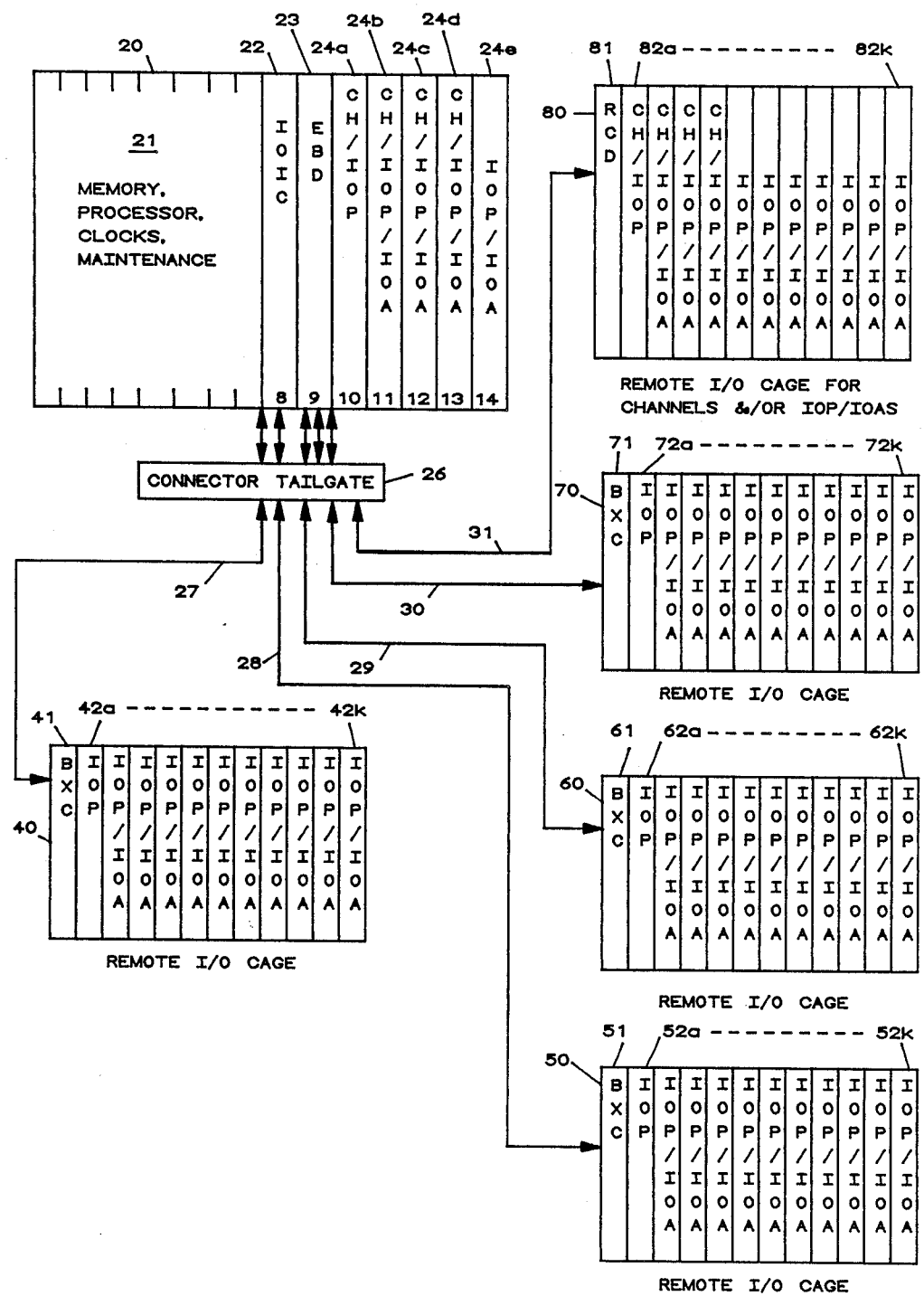
FIG. 2 is a schematic wiring diagram of the data bus cables extending between a central processing unit and various other units of a data processing system.

The system organization of the dual clocked data bus is shown in the wiring diagram of FIG. 2. The central processing unit 20 may take the form of a single card or a plurality of cards in a single card cage. CPU unit 20 will typically include a portion 21 having a processing unit, memory, clock circuitry and maintenance circuits. In the preferred embodiment, the CPU unit 20 will also have an I/O integrated controller card (IOIC) 22 which contains the data transfer logic associated with the data bus. An external bus driver card EBD 23 is provided for interfacing between the controller card 22 and additional external busses. In addition, the CPU may include logic cards 24a-24e which implement channels (CH) and I/O attachment cards (IOP/IOA).

The connector tailgate 26 accommodates the connection of data bus cables 27-31 leading to other units of the data processing system. Data bus cable 27 leads to remote I/O cage 40 and is connected to the bus extender card 41 therein. The remote I/O cage 40 will also have a plurality of I/O attachment logic cards 42a-42k which serve to interface the system to various remotely located I/O devices.

In similar fashion, data bus cable 28 is plugged to connector tailgate 26 and connects CPU 20 to the remote I/O cage 50 via the bus extender card 51 located therein. Remote I/O cage 50 will also include a plurality of I/O attachment logic cards 52a-52k.

Data bus cable 29 extends from connector tailgate 26 to bus extender card 61 to provide the connection between a third remote I/O cage 60 and CPU 20. Remote I/O cage 60 includes I/O attachment logic cards 62a-62k to accommodate the connection of various forms of remotely located I/O devices.

The data processing system may include a further remote I/O cage 70 which is connected by data bus cable 30 extending from connector tailgate 26 to the bus extender card 71. Remote I/O cage includes I/O attachment logic cards 72a-72k for connection of I/O devices.

A further data bus cable 31 leads from connector tailgate 26 to the bus extender card 81 located in remote I/O cage 80 for servicing channels or I/O devices. A plurality of logic cards 82a-82k are contained in remote I/O cage 80 for connection of I/O devices to the system and for implementation of the system channel.

Figure 3:
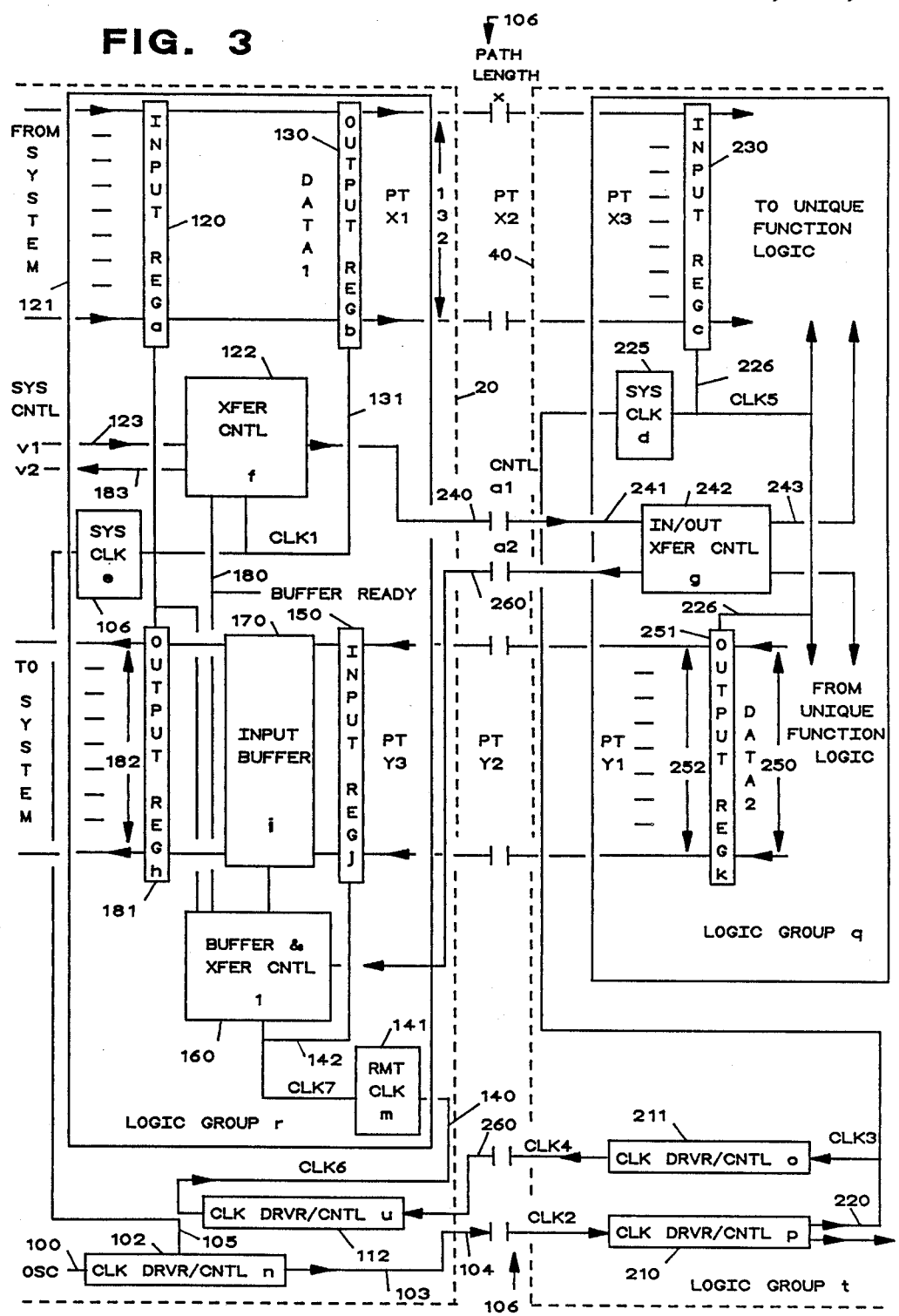
FIG. 3 is a schematic diagram of the logic circuits in various units connected to the data bus.

In FIG. 2, IOIC refers to an I/O integrated controller logic card; EBD refers to an external bus driver logic card; RCD refers to a remote channel driver logic card; BXC refers to a bus extender logic card; CH refers to a channel card; and IOP/IOA refers to I/O attachment cards. With the exception of the bus extender card and remote channel driver card, each of these logic cards provides the function implied by the name and may be conventional in form. For the purpose of simplifying the description, FIG. 3 shows an implementation of the invention with two unidirectional busses. In actual practice, it is usually more desirable to use an implementation which has a single, bi-directional, bus.

The sequence of events and the various logic elements involved in the transmission of data from the central processing unit to a remote unit and the transmission of data from a remote unit to the central processing unit are described with reference to FIG. 3.

A portion of the logic within CPU 20 is illustrated on the left. This comprises the data transfer logic associated with the CPU and will reside on the I/O integrated controller logic card 22 and the EBD card 23 shown in FIG. 2. A portion of the logic within the remote I/O logic unit card cage 40 is shown on the right. This comprises the data transfer logic associated with the remote unit and will reside on the bus extender logic card 41 unit and the RCD card shown in FIG. 2.

The system oscillator which resides in the CPU supplies an OSCILLATOR signal on line 100 leading to the clock driver/control logic 102. The output line 103 from clock driver/control logic 102 is connected to conductor 104 of multiple conductor data bus cable 106, which leads to the data transfer logic associated with the remote unit. The other output from clock driver/control logic 102 on line 105 leads to the system clock 106 which drives the requisite logic circuits associated with the data transfer logic. The function of the clock driver/control logic 102 and the other logic blocks 210, 211 and 112 of the same type is to receive a basic clock signal, redrive and balance the signal via transmission line lengths and delay lines to ensure that the timing relationship is controlled for the particular logic group it supplies.

Data from the central processing unit is clocked into input register 120 via parallel data lines 121 and the transfer control unit 122 is notified that the data has been transferred by a system control signal v1 signal on line 123. The data in input register 120 is then transferred to output register 130 by the output signal CLK1 on line 131 from system clock 106, thus energizing the data lines 132 of the data bus 106.

Data signals placed on data bus 106 are thereby clocked by the clock signal CLK1 on line 131 which bears a fixed relationship to the clock signal CLK2 on line 104 of data bus 106. Since the length of the parallel data lines 132 is the same as the length of clock signal line 104, both signals arrive at the remote unit in the same time relationship as they were placed on the bus. This will be true for data bus cables of all lengths.

In the remote I/O logic unit card cage 40, the output signal CLK3 on line 220, from clock driver/control 210, feeds system clock 225, which generates an output signal CLK5 on line 226. The leading edge of the CLK5 signal is effective to gate the data on lines 132 into the input register 230 during the time the data on lines 132 is valid. In other words, the logic in the remote unit 40 is effective to generate a separate clock which is dependent on and derived from the same clock as was used to gate the data onto the data bus.

The external unit will also commonly require a signal CNTRL a1, generated by the transfer control logic 122, indicating that valid data exists on the data bus lines 132. The CNTRL a1 signal on line 240 feeds the input 241 of input/output transfer control logic 242 to develop an output signal on line 243 which is used by other logic, not shown, in the remote I/O logic unit card cage 40.

Since the requirement for bi-directional communication exists, there is a return path from the remote unit 40 to the CPU 20. This path operates in similar fashion to the outgoing path and uses a clock signal derived from the CKL3 signal on line 220 which is in turn controlled by the OSCILLATOR and the CLK2 signal derived therefrom.

Data to be transferred from the remote unit 40 to CPU 20 is placed on lines 250 and loaded into output register 251 which has outputs connected to the parallel data lines 252 of data bus 106. The transfer of data from other registers, not shown, in remote unit 40, is effected under the control of the CLK5 signal on line 226. As described previously, the CLK5 signal is derived from the CLK3 signal which feeds the system clock 225 as well as the clock driver/control 211. The latter transmits a CLK4 signal to clock driver/control 112 in CPU 20 over clock signal line 260 of the data bus 106. Clock driver/control 112 develops CLK6 signal on output line 140 leading to the input of retransmitted clock 141, which in turn develops the CLK7 signal on line 142 leading to input register 150.

The leading edge of the CLK7 signal on line 142 gates the data on lines 252 of data bus 106 into input register 150. The input/output transfer control 242 in remote unit 40 develops a CNTL a2 signal on line 260 of data bus 106 leading to buffer and transfer control 160. The CNTL a2 signal indicates that the data on lines 252 of data bus 106 is valid and is used by buffer and transfer control 160 to begin transferring data from input buffer 150 to input buffer 170. Data from the remote unit will be successively transferred via this path until the input buffer 170 is sufficiently full to warrant transfer of the data therein to the system (CPU).

The transfer of data to the system is done under the control of the CL1 signal. This is necessary because the CLK4, CLK6 and CLK7 signals occur at an indeterminate time after the CLK1 signal. The BUFFER READY signal on line 180 from buffer and transfer control 160 to transfer control 122, effects the resynchronization and allows data in input buffer 170 to be transferred to output register 181 having output lines 182 available to the CPU. The CPU is then notified that valid data exists on lines 182 by the SYS CNTL v2 signal on output line 183 leading from transfer control 122.

Figure 4A:
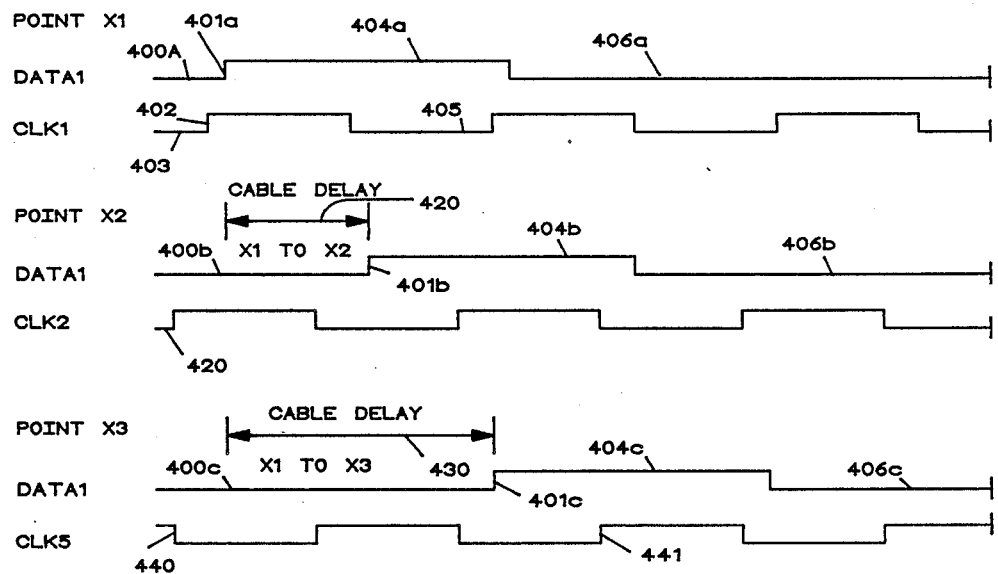
FIGS. 4a and 4b are timing diagrams showing the relationship of the data and clock signals on the data bus.
Figure 4B:
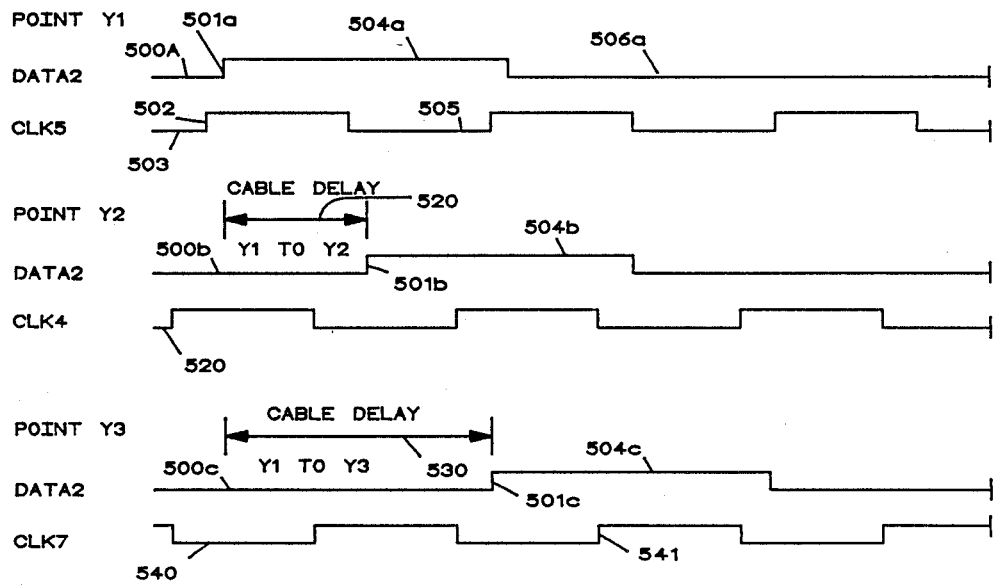

FIGS. 4a and 4b illustrate the time relationship between various signals previously described. The diagram of FIG. 4a illustrates the transfer of data from the CPU 20 to the remote unit 40. In this portrayal, the point designated X1 is located at the output of output register 130, the point X2 is located midway between the CPU 20 and the remote unit 40, and the point X3 is located at the input to input register 230.

At the point X1, which is located at the output of output register 130 as shown in FIG. 3, the data previously clocked into output register 130 is placed on the output lines 132 as indicated by the DATA1 signal 400a. As shown, the first rising edge 401a of signal 400a is slightly delayed from the first rising edge 402 of CLK1 signal 403 due to register, driver and other internal delays. In the portrayal, the first rising edge 402 of the CLK1 signal 403 has loaded a 1 bit 404a into output register 130 and the next rising edge 405 of the CLK1 signal 403 has loaded a 0 bit 406a into output register 130. It will be appreciated that the timing diagram is illustrative of a single data bit position and that the actual data bus will have a plurality of such positions depending on the width of the bus.

At the point X2, which is the point midway along the data bus 106 as shown in FIG. 3, the first rising edge 401b of the DATA1 signal 400b has been delayed a time 420 due to the transmission delay introduced by the cable. The rising edge 401b corresponds to the rising edge 401a of the DATA1 signal. The CLOCK2 signal 420, derived from the CLOCK1 signal 403, while displaced in time from the CLOCK1 signal 403, remains fixed with respect to the data signal.

At the point X3, which is the far end of the data bus 106 and the input to the input register 230, the DATA1 signal 400c on the data bus has been delayed a time 430, and is clocked into the input register 230 by the CLK5 signal 440. The CLK5 signal is controlled to keep the rising edge 441 within the time that data is valid on the line, represented by the high segment 404c. This takes into account all the delays introduced by the cable, semiconductor module, logic card, mounting board as well as logic, driver and receiver tolerances.

The transfer of data from the remote unit 40 to the CPU occurs in much the same fashion. At the point Y1, which is the far end of the data bus 106 located at the output of output register 251 as shown in FIG. 3, the data previously clocked into output register 251 is placed on the output lines 252 as indicated by the DATA2 signal 500a. As shown, the first rising edge 501a of signal 500a is slightly delayed from the first rising edge 502 of CLK5 signal 503 due to register, driver and other internal delays. In the portrayal, the first rising edge 502 of the CLK5 signal 503 has loaded a 1 bit 504a into output register 251, and the next rising edge 505 of the CLK5 signal 503 has loaded a 0 bit 506a into output register 251. It will be appreciated that the timing diagram of FIG. 4b is similar to that of FIG. 4a in that it is illustrative of a single data bit position and that the actual data bus will have a plurality of such positions depending on the width of the bus.

At the point Y2, which is the point midway along the data bus 106 as shown in FIG. 3, the first rising edge 501b of the data signal 500b has been delayed a time 520 due to the transmission delay introduced by the cable. The rising edge 501b corresponds to the rising edge 501a of the DATA2 signal. The CLOCK4 signal 520, derived from the CLOCK5 signal 503, while displaced in time from the CLOCK5 signal 503, remains fixed with respect to the data signal.

At the point Y3, which is the near end of the data bus 106 and the input to the input register 150, the signal 500c on the data bus has been delayed a time 530, and is clocked into the input register 150 by the CLK7 signal 540. The CLK7 signal is controlled to keep the rising edge 541 within the time that data is valid on the line, represented by the high segment 504c. This takes into account all the delays introduced by the cable, semiconductor module, logic card, mounting board as well as logic, driver and receiver tolerances.

In this fashion, data may be transferred over the data bus in either direction, and the clocking at the receiving end is accomplished with a clock signal placed on the bus at the transmitting end of the bus.

We claim:

1. A clock system including a parallel data bus suitable for use in the transfer of data among units of a data processing system comprising:
   a. a source of clock pulses in a first of said units;
   b. parallel data bus means connecting said first unit with other of said units;
   c. first data transfer logic in said first unit connected to said source of clock pulses and said data bus for transferring data and said clock pulses to said other units; and
   d. second transfer logic in each of said other units for receiving said transferred data and clock pulses and for transferring data and said received clock pulses to said first unit whereby said source of clock pulses is used to control the transmission of data at said first unit and said other units.

2. A clock system according to claim 1 wherein said first unit is located on a single logic card.

3. A clock system according to claim 1 wherein said first unit is a central processing unit.

4. A clock system according to claim 2 wherein said other units are located on other logic cards.

5. A clock system according to claim 4 wherein said logic cards are located in a first logic card cage.

6. A clock system according to claim 4 wherein at least one of said other logic cards is located in a second card cage.

7. A clock system according to claim 6 wherein said parallel data bus means connecting said units is a multiple wire cable.

8. A clock system according to claim 7 wherein said multiple wire cable has individual conductors for each data bit position, for control signals and for outgoing and incoming clock signals.

9. A clock system according to claim 1 wherein said first unit and said other units are connected by a multiple wire cable having individual conductors for each data bit position, control signals and a clock signal.

10. A clock system according to claim 9 wherein said cable includes an individual conductors for conveying the clock signal from the central processing unit to the other units and an individual, separate, conductor for conveying the clock signal from the other units to the central processing unit.

11. A clock system according to claim 10 wherein said first unit comprises a central processing unit and at least one of said other units is located on other logic card.

12. A system according to claim 11 wherein said source of clock pulses in said central processing unit is located on a first logic card and first logic card and at least one of said other logic cards are mounted in a first card cage.

13. A system according to claim 12 wherein at least one of said other logic cards is located in a second card cage remote from said first card cage.

14. A system according to claim 13 wherein said first logic card and said other logic cards are connected by a multiple wire cable.

15. A system according to claim 14 wherein said cable has a plurality of equal length conductors for conveying data and clock signals.

16. A system according to claim 15 wherein said cable has first and second clock signal conductors for conveying clock signals in opposite directions.

17. A system according to claim 16 wherein said first data transfer logic gates clock pulses onto said first conductor and said second data transfer logic gates clock signals is derived from the said first conductor onto said second conductor.

18. A parallel data bus system for the transfer of data between units of a data processing system comprising:
   a. a first unit having data transfer logic including a source of clock pulses and means for gating said pulses onto a cable;
   b. a second unit;
   c. a multiple conductor cable connecting said units;
   d. said cable having a first conductor for conveying gated clock pulses from said first unit to said second unit;
   e. said cable having a second conductor for conveying a clock signal from said second unit to said first unit;
   f. said cable having other conductors for conveying data signals between said units; and
   g. data transfer logic in said second unit for receiving said clock pulses on said first conductor from said first unit and retransmitting it as said clock signal to said first unit over said second conductor whereby both said units receive clock signals and data signals over said cable.

19. A system according to claim 18 wherein said data transfer logic in said first and second units includes means for gating data onto said multiple conductor cable and for gating data from said multiple conductor cable.

20. A system according to claim 19 wherein said data transfer logic in said first unit includes means for gating said clock signal and data signals onto said multiple conductor cable.

21. A system according to claim 20 wherein said data transfer logic in said second unit includes means for gating data, and a clock signal derived from the clock signal received from said first unit, onto said multiple conductor cable.

22. A system according to claim 21 wherein said data transfer logic includes means for decoding data signals from said multiple conductor cable according to a clock signal received from said cable.

* * * * *